US008952782B2

(12) United States Patent
Kilbourne

(10) Patent No.: US 8,952,782 B2
(45) Date of Patent: Feb. 10, 2015

(54) REMOTELY ACTUATABLE LOCKING SYSTEM AND METHOD FOR FORMING DOORS FOR ACCOMMODATING SUCH SYSTEMS

(76) Inventor: Mark Kilbourne, Houston, TX (US)

( * ) Notice: Subject to any disclaimer, the term of this patent is extended or adjusted under 35 U.S.C. 154(b) by 1022 days.

(21) Appl. No.: 12/661,498

(22) Filed: Mar. 18, 2010

(65) Prior Publication Data

US 2011/0227743 A1 Sep. 22, 2011

(51) Int. Cl.

| | |
|---|---|
| ***B60R 25/00*** | (2013.01) |
| ***G08C 17/00*** | (2006.01) |
| ***E05B 47/00*** | (2006.01) |
| ***E05B 47/02*** | (2006.01) |
| *E06B 3/82* | (2006.01) |
| *E06B 3/70* | (2006.01) |

(52) U.S. Cl.

CPC ............ *G08C 17/00* (2013.01); *E05B 47/0012* (2013.01); *E05B 47/026* (2013.01); *E05B 2047/002* (2013.01); *E05B 2047/0091* (2013.01); *E05B 2047/0094* (2013.01); *E06B 3/822* (2013.01); *E06B 2003/7046* (2013.01)

USPC ................... 340/5.7; 340/5.2; 70/91; 70/101; 70/275

(58) Field of Classification Search

CPC . E05B 47/00; E05B 47/0001; E05B 47/0012; E05B 47/02; E05B 47/026; E05B 63/0056; E05B 77/44; E05B 9/00; E05B 2009/006; E05B 9/08; E05B 15/00; E05B 17/0004; E05B 2047/0091

USPC ......................... 340/5.7, 5.2; 70/91, 101, 275

See application file for complete search history.

(56) References Cited

U.S. PATENT DOCUMENTS

| | | | | |
|---|---|---|---|---|
| 3,720,937 | A * | 3/1973 | Lang et al. | 340/543 |
| 4,438,962 | A * | 3/1984 | Soloviff et al. | 292/144 |
| 5,083,122 | A * | 1/1992 | Clark | 340/5.22 |
| 5,196,841 | A * | 3/1993 | Harder et al. | 340/5.73 |
| 5,203,112 | A * | 4/1993 | Yamagishi et al. | 49/280 |
| 5,437,174 | A * | 8/1995 | Aydin | 70/278.3 |
| 5,782,118 | A * | 7/1998 | Chamberlain et al. | 70/278.3 |
| 5,946,955 | A | 9/1999 | Suggs | |
| 5,994,645 | A * | 11/1999 | Suzuki et al. | 174/72 A |
| 6,032,991 | A * | 3/2000 | Yeh | 292/336.3 |
| 6,181,252 | B1 | 1/2001 | Nakano | |
| 6,259,352 | B1 * | 7/2001 | Yulkowski et al. | 340/5.7 |
| 6,304,168 | B1 | 10/2001 | Ohta | |
| 6,580,355 | B1 * | 6/2003 | Milo | 340/5.7 |
| 6,585,302 | B2 * | 7/2003 | Lin | 292/142 |
| 6,619,085 | B1 * | 9/2003 | Hsieh | 70/257 |

(Continued)

*Primary Examiner* — Steven Lim
*Assistant Examiner* — Ryan Sherwin

(57) ABSTRACT

A door usable for after market installation of remotely actuatable locking systems is provided with a spacer element within its interior. The spacer element includes an orifice sized for accommodating a motor and locking mechanism. A tubular element is also provided through the interior of the door body adjacent to the first orifice, the tubular element being usable to accommodate wiring. A motor disposed within the first orifice can be placed in communication with a power source and/or receiver using wiring extending through the tubular element, while a lock assembly can be installed within the first orifice in operative engagement with the motor. Receipt of a remote signal by the receiver causes actuation of the motor, which then actuates the lock assembly. Use of the spacer and tubular elements enables all primary components of the remotely actuatable locking system to be installed within the interior of the door, after market.

21 Claims, 5 Drawing Sheets

(56) References Cited

U.S. PATENT DOCUMENTS

| | | | | |
|---|---|---|---|---|
| 6,666,054 | B1 * | 12/2003 | Hsieh | 70/257 |
| 6,918,276 | B2 * | 7/2005 | Van Parys | 70/257 |
| 7,114,178 | B2 | 9/2006 | Dent | |
| 7,393,023 | B1 | 7/2008 | Kelly | |
| 7,469,564 | B1 * | 12/2008 | Shaw | 70/283 |
| 7,548,151 | B2 | 6/2009 | Roosli | |
| 8,264,323 | B2 * | 9/2012 | Chandler, Jr. | 340/5.7 |
| 8,353,189 | B2 * | 1/2013 | Bogdanov et al. | 70/472 |
| 2002/0190842 | A1 | 12/2002 | Sasaki | |
| 2009/0139146 | A1 | 6/2009 | Houser | |
| 2009/0160211 | A1 * | 6/2009 | Krishnan et al. | 296/146.4 |
| 2009/0278642 | A1 * | 11/2009 | Fullerton et al. | 335/284 |

* cited by examiner

REMOTELY ACTUATABLE LOCKING SYSTEM AND METHOD FOR FORMING DOORS FOR ACCOMMODATING SUCH SYSTEMS

FIELD

The present invention relates, generally, to a remotely actuatable locking system for a door, and methods for constructing a door usable for after-market installation of remote locking systems with any type of deadbolt or similar locking apparatus.

BACKGROUND

Conventional residential exterior doors typically include one or more manual, keyed deadbolt locks. These locks function through extension and retraction of a sliding bolt, which extends between the door and the adjacent doorframe when in a locked position, thereby preventing opening of the door. The interior of each lock is provided with a series of cut pins, the location of each cut corresponding to the height of the teeth disposed on a complementary key. When the proper key is inserted into a lock, each pin is raised by the corresponding tooth of the key inserted below, such that the cuts in each of the pins align, allowing manual rotation of the lock to retract the bolt. While deadbolt locks are generally regarded as an effective security measure, both due to their durability and due to the fact that a unique key is required to operate the lock, manual locks also suffer from a variety of difficulties and inconveniences. For example, modern keys are small in size, and can be readily lost or stolen, requiring any associated locks to be rekeyed to ensure security. Manual operation of a keyed lock can also be cumbersome, such as when attempting to carry objects into a residence, or when rapid entry is necessary, such as during inclement weather or when confronted by a potentially dangerous individual or animal.

Remote and/or keyless entry systems have become more prevalent as technology has advanced, with use of unique remote signals to actuate a lock providing comparable security to that of a key. Most remote entry systems have been restricted to vehicles, safes, and industrial applications, while residential uses have been limited due to the expense of such a system and the specific manufacturing requirements of differing door, lock, and remote system manufacturers. No convenient, inexpensive, and reliable method exists for after-market installation of remote entry systems on existing doors.

Remote entry systems are often encumbered by a limited range, due to ineffective antennae and similar receiving mechanisms. Conventional remote entry systems also require bulky and unsightly external wiring, motor housing, and electrical components. Additionally, many remote entry systems utilize battery power sources, which can unknowingly become depleted, and which require frequent, potentially costly replacement. Further, while some remote entry systems provide an audible signal when a lock is engaged or released, conventional systems provide this audible signal to the interior of a structure, mitigating the effectiveness of the signal when exiting the structure and remotely engaging the lock.

A need exists for a remotely actuatable locking system that overcomes the deficiencies of conventional remote entry systems by enabling use of powerful exterior antennae, components installable within the body of a door, structure-based power supplies, an audible signal produced external to the structure, or combinations of these features.

A need also exists for a method for forming doors that are able to accommodate after-market installation of a remotely actuatable locking system, usable with any type of locking mechanism.

The present invention meets these needs.

BRIEF DESCRIPTION OF THE DRAWINGS

In the detailed description of the embodiments of the invention presented below, reference is made to the accompanying drawings, in which.

The depicted embodiments of the invention are described below with reference to the listed Figures.

DETAILED DESCRIPTION OF THE EMBODIMENTS

Before explaining the disclosed embodiments of the present invention in detail, it is to be understood that the present invention is not limited to the particular embodiments depicted or described, and that the invention can be practiced or carried out in various ways.

The present invention relates, generally to remotely actuatable locking systems, methods for constructing doors capable of after-market installation of remotely actuatable locking systems, and methods for installation of remotely actuatable locking systems within such doors.

While installation of conventional remote entry systems requires specific manufacture of a door containing necessary components therein, or installation of cumbersome and unsightly external components, embodiments of the present method include a manufacturing process for a door having compartments that can accommodate fixed and adjustable components for installation of a remotely actuatable locking system either during manufacture, or as an after-market addition, including a sliding bolt or similar locking device, a motor, one or more adjustable gears, and electrical conductors usable to communicate between the motor and a power source, receiver, and/or sound device.

Figure 1:
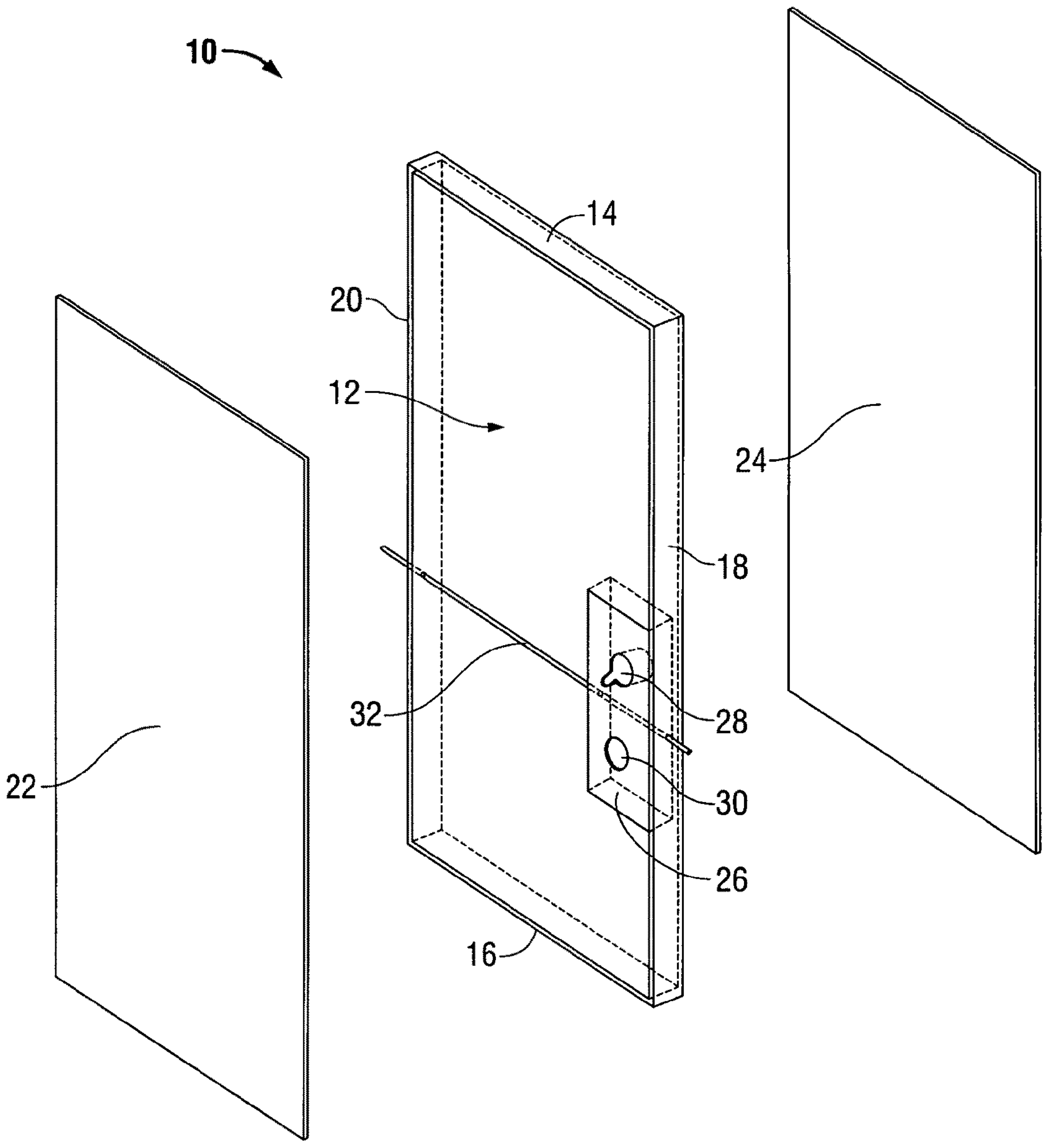
FIG. 1 depicts an exploded view of an embodiment of a door usable for accommodating a remotely actuatable locking system.

In an embodiment of the invention, a door (10) is provided, as shown in FIG. 1. The depicted door (10) includes a body having an interior (12) defined by a top edge (14), a bottom edge (16), a front edge (18), and a rear edge (20). Typically, the edges (14, 16, 18, 20) can be formed from wood, steel, fiberglass, plastic, metals, composites, polymers, or combinations thereof. In a conventional manufacturing process, the interior (12) of the door (10) is filled with foam or another suitable core material, then exterior panels (22, 24), formed from steel, wood, or another durable material, are secured to the edges (14, 16, 18, 20) to enclose the interior (12). Locks, latches, and/or doorknobs, as known in the art, can then be installed proximate to the front edge (18), while the rear edge (20) can accommodate hinges or similar devices to enable pivotal movement of the door when installed.

Prior to filling the interior (12) of the door (10) with core material, embodiments of the present invention include installation of a spacer element (26) adjacent to the front edge (18) at a location within the door (10) where the installation of a lock assembly, a doorknob assembly, and corresponding latches is intended. The spacer element (26) can include a first orifice (28), which can be drilled or otherwise provided therein, sized to accommodate a motor, one or more gears or other similar mechanisms for transferring motion, and a lock assembly. The first orifice (28) can be sized such that the distance between the first orifice (28) and the front edge (18), and the diameter of the first orifice (28) correspond to standard sizes and distances used in the manufacture of doors. For example, in an embodiment of the invention, an upper portion of the first orifice (28) can have a diameter of approximately 2.125 inches for accommodating lock assemblies of a standard size, from any manufacturer, while the distance between the first orifice (28) and the front edge (18) can correspond to a standard length of a deadbolt latch. Lower portions of the first orifice (28) can be similarly sized for containment of gear assemblies and a motor. Inclusion of the first orifice (28) enables a motor, one or more gear assemblies, and/or other components to be readily installed into the interior (12) of the door (10), rather than externally, during manufacture, or as an after-market addition, without requiring extensive time or modification to the door (10).

In an embodiment of the invention, the spacer element (26) can have a second orifice (30) provided therein, the second orifice (30) being sized to accommodate a doorknob assembly. The second orifice (30) can be provided with a standard size, such as a diameter of 2.125 inches, for accommodating standard doorknob assemblies from any manufacturer. Similarly, the distance between the second orifice (30) and the front edge (18) can be a standard distance that corresponds to a standard length of a doorknob latch.

A tubular element (32) is also shown installed within the interior (12) of the door (10), extending from the front edge (18), through the spacer element (26), to the rear edge (20). The tubular element (32) can include any hollow, generally rigid object, such as a plastic, metal, or rubber tube, which is usable to define a channel through the door (10) for accommodating wiring and/or other conducting materials. While FIG. 1 depicts the tubular element (32) as a generally narrow, straight, cylindrical, tube, it should be understood that tubular elements of any shape or dimensions can be used. Inclusion of the tubular element (32) enables wiring between a motor within the first orifice (28) and other components external to the door (10) to be run through the interior (12) of the door (10), such that no use of wiring or similar components external to the door (10) is necessary. Placement of wiring and other components within the interior (12) of the door (10) is of particular benefit when utilizing exterior door panels formed from steel or another metal, as large metallic components of the door can interfere with signals transmitted and received using conventional external remote locking systems.

Figure 2:
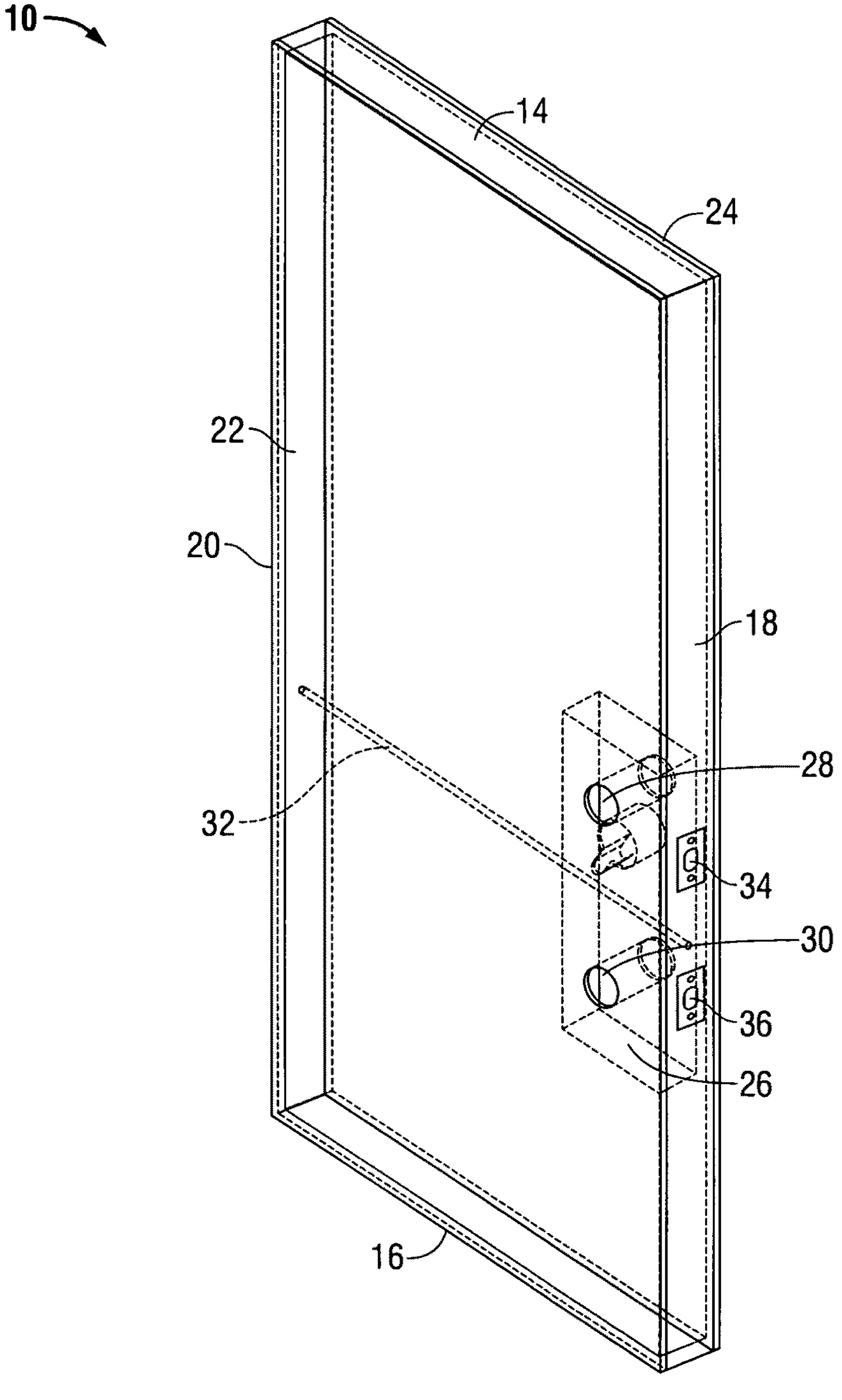
FIG. 2 depicts an assembled view of the door of FIG. 1.

FIG. 2 depicts an assembled view of the door (10) of FIG. 1, having the exterior panels (22, 24) and edges (14, 16, 18, 20) enclosing the interior. The internal position of the spacer element (26) and tubular element (32) within the door (10) are depicted using phantom lines. Orifices within the first exterior panel (22) and the second exterior panel (24) are provided in alignment with the first orifice (28) and the second orifice (30) in the spacer element (26), such that the first and second orifices (28, 30) can be accessed for installation of components of a remote locking system. A first latch hole (34) is provided within the front edge (18) in alignment with the first orifice (28) for accommodating a bolt or similar latching mechanism of a lock installed within the first orifice (28). A second latch hole (36) is also depicted within the front edge (18) in alignment with the second orifice (30) for accommodating a latch or similar component of a doorknob assembly installed within the second orifice (30).

Figure 3:
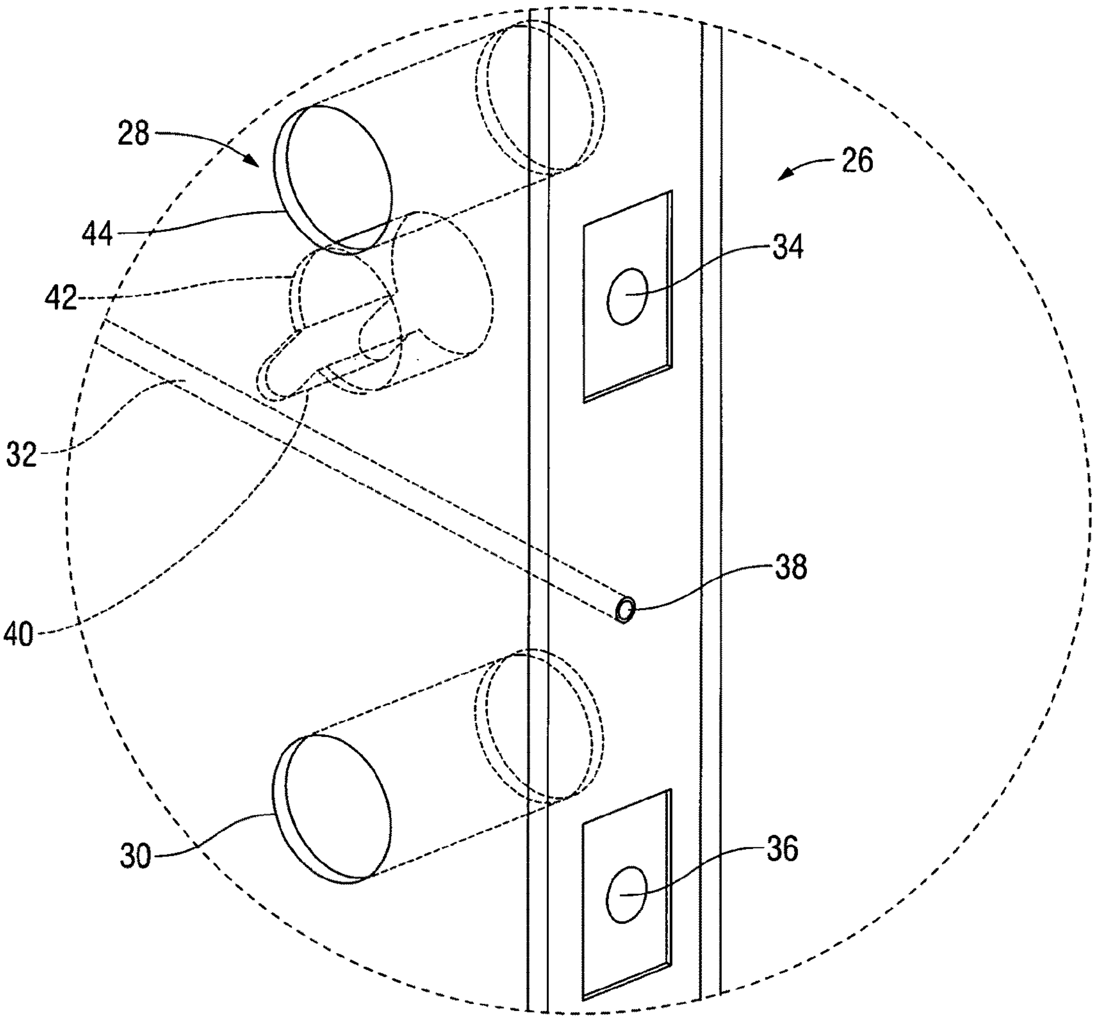
FIG. 3 depicts a perspective view of an embodiment of a spacer element installed within the door of FIG. 2.

FIG. 3 depicts a perspective view of the portion of the door that includes the spacer element (26) within, to more clearly depict the first orifice (28), second orifice (30) and tubular element (32). The tubular element (32) is shown having a first end (38) into which an end of a wire or similar conductor can be inserted. A second end (not visible in FIG. 3) can be disposed at the opposing end of the door, through which a wire inserted through the first end (38) can be extended and engaged with external components, such as power sources and integral or separate receivers and/or audio devices. The first orifice (28) is shown having a plurality of recesses for accommodating a motor, one or more gear assemblies, and a lock assembly. Specifically, the first orifice (28) is depicted including a lower recess (40) for accommodating a motor, a middle recess (42) for accommodating one or more gear assemblies, and an upper recess (44), for accommodating a lock assembly. The lower recess (40) intersects the tubular element (32), such that wiring or other conductors extended through the tubular element (32) can engage a motor within the lower recess (40) and communicate between the motor and any power sources, receivers, and/or audio devices.

In use, an end of a wire or similar conductor can be inserted into the first end (38) of the tubular element (32), then extended through the tubular element (32) such as by pushing the wire with a narrow rod or similar implement. Once the end of the wire has been extended beyond the second end of the tubular element (32), it can be pulled or otherwise drawn through the tubular element (32) until the end of the wire is disposed within the lower recess (40) of the first orifice (28). A motor can then be engaged with the wire, placed into the upper recess (44) through the first orifice (28) and allowed to drop into the lower recess (40). One or more gear assemblies, if necessary, can also be inserted through the first orifice (28) and allowed to drop into the middle recess (42). The gear assemblies can be adjustable to accommodate lock assemblies from varying manufacturers that require a differing vertical distance between the lower recess (40) and an engagement member of the lock assembly.

Before or after installation of a motor, gear assemblies, and a lock assembly, the opposing end of the wire can be engaged with one or more power sources, receivers, and/or audible devices external to the door. In an embodiment of the invention, a usable power source, receiver, and/or audio device can include an integral component or system within the structure into which the door is installed. For example, the motor can be engaged in electrical communication with a doorbell, a security system, or similar system or component within a structure, the doorbell or security system thereby providing electrical power to the motor, while also functioning as an exterior antenna, and optionally, an audio device able to produce sound on both the interior and exterior side of the door.

While a sufficient length of wire can be extended through the door to ensure movement of the door without impinging or breaking the wire, in an embodiment of the invention, a biased spool or similar apparatus for containing a quantity of cord or wire can be disposed within a wall adjacent to the door, and wire extending through the tubular element (32) can be secured around the spool. Extension and retraction of the wire caused by opening and closing of the door can then cause rotation of the spool to dispense and recover the wire, respectively. To avoid a need for external or intrusive wiring, a wire extended from the first orifice (28) through the tubular element (32) beyond the rear edge of the door can further be extended upward, downward, and/or laterally, as necessary, through the adjacent wall and/or doorframe, and above or below the door, to engage a power source or other components within the structure.

Figure 4:
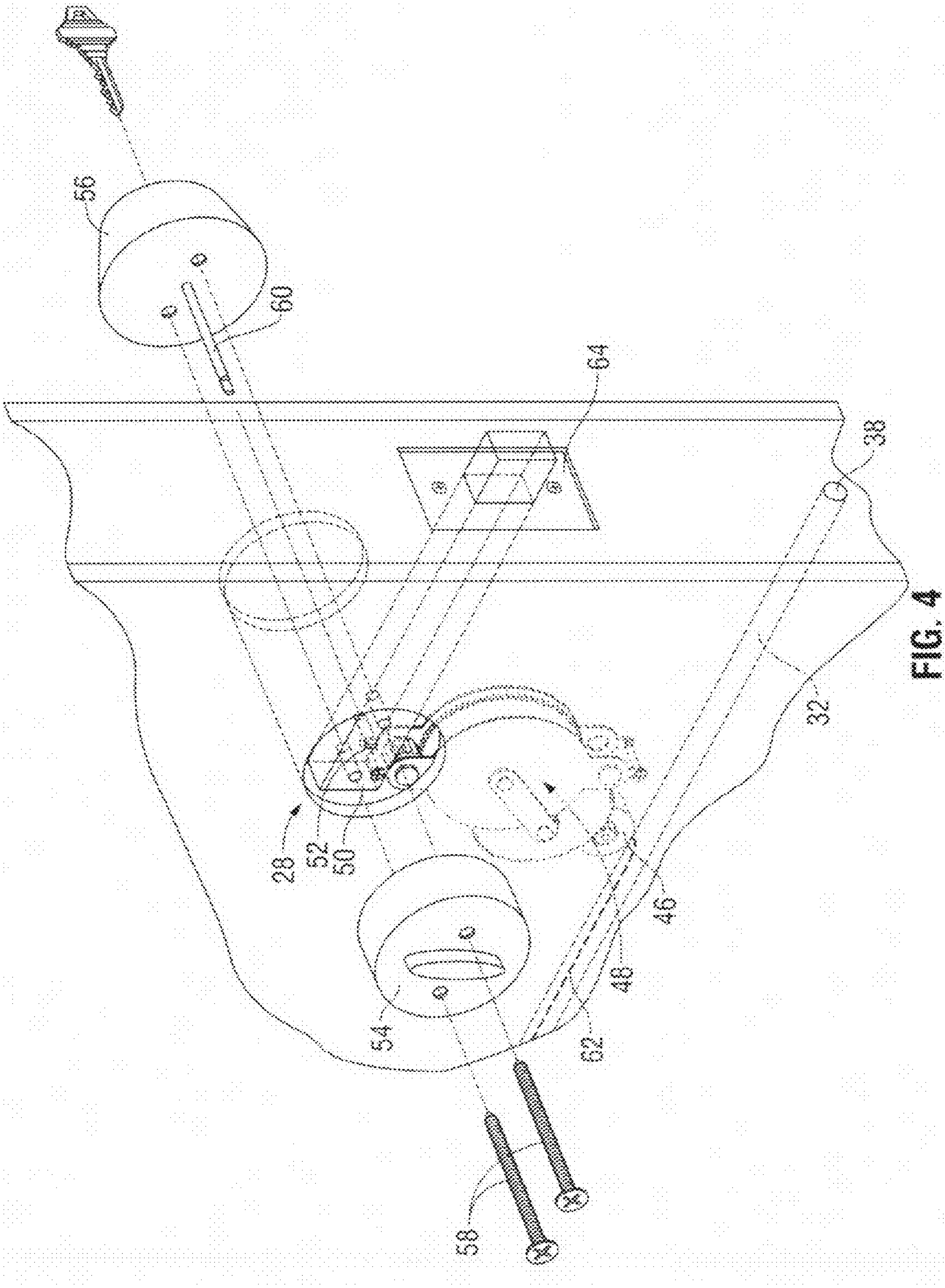
FIG. 4 depicts an exploded view of a lock mechanism installed within the spacer element of FIG. 3.

Referring now to FIG. 4, an exploded view of a remote locking mechanism installed within the spacer element of FIG. 3 is shown. Specifically, a motor (46) disposed within the first orifice (28) is shown engaged with a wire (62) within the tubular element (32). A gear assembly (48) is shown installed above and in operative association with the motor (46), such that an upper tailpiece gear of the gear assembly (48) is engageable with a lock assembly. The gear assembly (48) can be adjustable, such as through use of a movable and/or rotating arm between adjacent gears, to accommodate any necessary distance between the motor (46) and the lock assembly.

FIG. 4 depicts the lock assembly including a latch (50) installed within the first orifice (28), the latch (50) extending through the first latch hole (34, depicted in FIG. 3), which is shown provided with a latch plate (64). The latch (50) includes a hole (52) sized and shaped to accommodate a pin or tailpiece (60) (i.e. a spindle) of the lock assembly. While the shape and/or dimensions of the pin or tailpiece (60) and corresponding hole (52) can vary, FIG. 4 depicts the pin or tailpiece (60) as an elongate rod having a generally D-shaped cross section. The lock assembly is also shown having an interior faceplate (54) and an exterior faceplate (56) having the pin or tailpiece (60) secured thereto. The pin or tailpiece (60) can be threaded through the hole (52), and the interior and exterior faceplates (54, 56) can be secured together, such as through use of one or more screws (58) or similar fasteners, such that manipulation of a rotatable switch or a similar member on the interior faceplate (54), and/or rotation of a keyed portion of the exterior faceplate (56), causes rotation of the pin or tailpiece (60), thereby extending or retracting the latch (50).

While the depicted lock assembly can be operated through use of manual keys and/or other rotatable members, the pin or tailpiece (60) can also be engageable with the gear assembly (48), such that actuation of the motor (46) causes rotation of one or more gears of the gear assembly (48), which in turn causes rotation of the pin or tailpiece (60), thereby extending or retracting the latch (50). In addition to the provision of electrical power to the motor (46), the wire (62) within the tubular element (32) is usable to communicate between the motor (46) and a receiver, such that receipt of a remote signal can cause actuation of the motor (46) and subsequent extension or retraction of the latch (50). Additionally, the motor (46) can be provided in communication with one or more audio devices, such that when the motor (46) is actuated and the latch (50) is extended or retracted, an audible signal can be provided to the interior and/or exterior of the structure. In an embodiment of the invention, differing audible signals can be provided when the latch (50) is extended or retracted. In a further embodiment of the invention, the first orifice (28) can be provided with a detector, usable to detect the position of the latch (50) such that actuation of the motor (46) can be ceased when the latch (50) becomes fully extended or retracted. For example, a tube or similar elongate member having a white or reflective tip can be provided behind the latch (50), such that when the latch (50) is fully extended, the tip of the tube is visible to an optical sensor operatively connected to the motor (46). Detection of the tube by the optical sensor can be thereby be used to control actuation of the motor (46).

Figure 5:
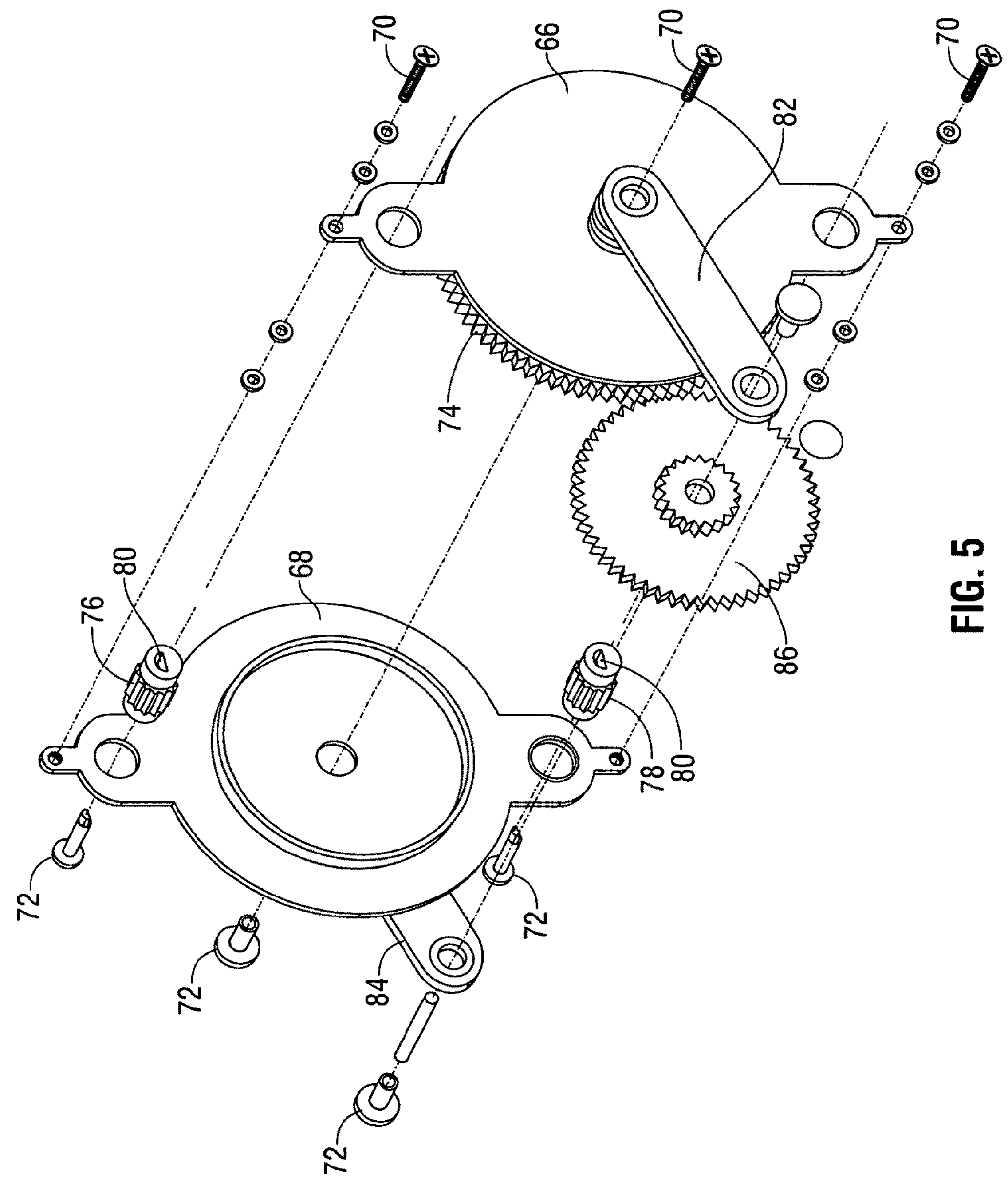
FIG. 5 depicts an embodiment of a gear assembly usable with embodiments of a remotely actuatable locking system.

Referring now to FIG. 5, an embodiment of a gear assembly usable within the scope of the present invention is depicted. The gear assembly is shown having a body formed generally from a first faceplate (66) and a second faceplate (68) (i.e. mounting plates), which in an embodiment of the invention, can be generally identical, formed from the same or identical molds. The faceplates (66, 68) can be secured together in opposition using any manner of fastening means, such as one or more screws (70), which engage corresponding threaded receptacles (72). Various washers and/or nuts are also usable, as known in the art. Between the faceplates (66, 68), a central gear (74) is secured, in operative engagement with an upper tailpiece gear (76) and a lower tailpiece gear (78). The upper tailpiece gear (76) includes a shaped hole (80), which is sized and shaped for engagement with the pin and/or tailpiece of a lock assembly (60, depicted in FIG. 4), such that rotation of the upper tailpiece gear (76) actuates the lock assembly, thereby extending and retracting the associated latch. A similar shaped hole or other manner of engagement can be included in the lower tailpiece gear (78), such that the gear assembly can be vertically inverted to selectively engage differing brands of lock assemblies.

The first faceplate (66) is shown having a first rotatable arm (82) disposed on the side of the first faceplate (66) opposite the central gear (74). Similarly, the second faceplate (68) includes a second rotatable arm (84) disposed on the side of the second faceplate (68) opposite the central gear (74). The rotatable arms (82, 84) are usable to secure an engagement gear (86) therebetween, in operative engagement with the central gear (74), the engagement gear (86) being engageable with a motor. Actuation of the motor then causes rotation of the engagement gear (86), which subsequently causes rotation of the central gear (74), which in turn rotates the upper tailpiece gear (76), thereby rotating the pin and/or tailpiece of the associated lock assembly to extend or retract the associated latch. The rotatable arms (82, 84) are adjustable to accommodate varying distances between a motor and lock assembly, and further, are rotatable about the circumference of the faceplates (66, 68), such that the engagement gear (86) can be engaged on either side of the central gear (74). The rotatable arms (82, 84) thereby enable the depicted gear assembly to be used within doors having lock assemblies on either side.

Embodiments of the present invention thereby provide for after-market installation of any type of remotely actuatable locking system and/or lock assembly from any manufacturer or builder. Embodiments of the present invention further provide for remotely actuatable locking systems that overcome the deficiencies of conventional remote entry systems, by enabling connection of a motor to systems usable as powerful external antennae, such as a home doorbell, security system, or similar component, which can function simultaneously as a power source, a receiver, and an audio device able to provide an audible indication both internal and external to a structure when a lock is actuated. Through use of an internal spacer element, with orifices sized for accommodating components of a remotely actuatable locking system, and a tubular element usable to accommodate wiring, all primary components of a remotely actuatable locking system are able to be installed with the body of a door, eliminating the need for external components.

While the present invention has been described with emphasis on certain embodiments, it should be understood that within the scope of the appended claims, the present invention can be practiced other than as specifically described herein.

What is claimed is:

1. A remotely actuatable locking system comprising:

a door comprising a slidable latch engageable within a complementary receptacle of a doorframe adjacent to the door;

a motor in operative communication with the slidable latch, wherein the motor rotates a door lock spindle causing the slidable latch to move between a retracted position within the door and an extended position within the complementary receptacle, wherein the motor is positioned within an internal area of the door between the door panels, wherein the motor is adapted to be inserted into the internal area of the door through an orifice extending through exterior door panels, wherein the orifice is adapted to receive the door lock spindle; and a channel extending through the door adjacent to the motor, the channel comprising a wire disposed therein, wherein the wire communicates between the motor, a power source external to the door, and a receiver external to the door, and wherein the motor is actuated responsive to a remote signal received by the receiver thereby causing extension or retraction of the slidable latch.

2. The system of claim 1, further comprising at least one gear operably disposed between the motor and the slidable latch such that actuation of the motor causes rotation of said at least one gear which causes movement of the slidable latch, wherein said at least one gear receives the door lock spindle through a central hole in said at least one gear, wherein the at least one gear is centrally positioned within the orifice, wherein the orifice is round and has a diameter of about 2.125 inches.

3. The system of claim 1, wherein the power source and the receiver comprise a single article, wherein the power source comprises an alternating current source, a direct current source, or combinations thereof disposed within a wall or structure adjacent to the door.

4. The system of claim 1, wherein the receiver produces an audible sound, a visible signal, or combinations thereof, when the remote signal is received and the motor is actuated.

5. The system of claim 1, further comprising:

a first gear comprising a central hole adapted to receive and non-rotatably engage with the door lock spindle, wherein the motor rotates the first gear, wherein the first gear is adapted to be positioned within the orifice, wherein the door lock spindle extends through the center of the orifice, wherein the orifice is enclosed by exterior faceplates of the door lock.

6. The system of claim 5, further comprising:

a mounting plate, wherein the first gear is rotatably connected with the mounting plate; and a central gear rotatably connected with the mounting plate, wherein the central gear rotates the first gear, and wherein the motor rotates the central gear.

7. A method for forming a door capable of after-market installation of a remotely actuatable locking system, the method comprising the steps of:

providing a door body comprising an interior, a first edge, and a second edge opposite the first edge;

providing the interior of the door body with a spacer element adjacent to the first edge, wherein the spacer element comprises a first orifice sized for accommodating a motor and a locking mechanism, wherein the locking mechanism comprises at least one gear having a central hole for receiving a door lock spindle, wherein the first orifice is adapted for receiving a door lock spindle;

providing a tubular element through the interior of the door body and the spacer element adjacent to the first orifice, wherein the tubular element intersects the second edge;

enclosing the interior of the door body with door panels, wherein the door panels comprise panel orifices having a diameter of about 2.125 inches disposed over the first orifice such that the first orifice is accessible through the door panels; and inserting the motor and the locking mechanism into the interior portion of the door through the first orifice and one of the panel orifices.

8. The method of claim 7, further comprising the steps of:

providing a conductor comprising a first end and a second end into the tubular element such that a first end of the conductor is disposed within the first orifice;

extending the second end of the conductor beyond the second edge;

engaging the second end of the conductor with a power source, a receiver, or combinations thereof, external to the door body;

engaging the motor with the first end of the conductor;

positioning said at least one gear in the first orifice in alignment to receive the door lock spindle; and operatively engaging the locking mechanism with the motor, wherein receipt of a remote signal by the receiver causes actuation of the motor, thereby causing actuation of the locking mechanism.

9. The method of claim 8, wherein the steps of providing the conductor and extending the second end of the conductor comprise inserting the second end of the conductor into the tubular element proximate to the first edge, pushing the conductor through the tubular element until the second end of the conductor exits the tubular element proximate to the second edge, and pulling the second end of the conductor through the tubular element until the first end of the conductor is disposed within the first orifice.

10. The method of claim 8, wherein the step of providing the motor through the panel orifices into the first orifice further comprises providing said at least one gear engaged with the motor into the first orifice, and wherein the step of operatively engaging the locking mechanism with the motor comprises engaging the locking mechanism with said at least one gear such that actuation of the motor causes rotation of said at least one gear which causes actuation of the locking mechanism.

11. The method of claim 7, wherein the spacer element further comprises a second orifice sized for accommodating a doorknob assembly.

12. The method of claim 11, further comprising the step of providing a doorknob assembly into the second orifice.

13. The system of claim 7, wherein the panel orifices are adapted to be covered by exterior faceplates of a door lock.

14. A door locking system comprising:

a mounting plate;

a central gear rotatably connected with the mounting plate;

a first gear comprising a first central hole adapted to receive and non-rotatably engage a first door lockset spindle, wherein the central gear rotates the first gear; and an electrical motor rotating the central gear, wherein the door locking system is adapted for installation within the interior portion of a door.

15. The system of claim 14, further comprising:

a second gear comprising a second central hole adapted to receive and non-rotatably engage with a second door lockset spindle, wherein the central gear rotates the second gear, and wherein the second gear is located opposite the first gear.

16. The system of claim 14, further comprising:

a third gear operatively connected with the electrical motor, wherein the third gear meshes with the central gear, and wherein the third gear is connected with the mounting plate.

17. The system of claim 16, wherein the third gear is connected with the mounting plate by an arm, and wherein the arm is rotatably connected to the mounting plate and rotatably connected to the third gear, thereby enabling the third gear to translate about the central gear.

18. The system of claim 16, wherein the central gear, the first gear, the second gear, and the third gear comprise a parallel configuration.

19. The system of claim 14, wherein the door locking system is adapted to be inserted into the interior portion of the door through an orifice extending through the door, wherein the orifice extends through both exterior door panels, wherein the orifice receives the first door lockset spindle.

20. The system of claim 19, wherein the first gear is adapted to be centrally positioned within the orifice to receive the first door lock spindle extending through the orifice.

21. The system of claim 19, wherein the door locking system is adapted to be inserted into the interior portion of the door through an orifice having a generally round shape and a diameter of about 2.125 inches.

* * * * *